(12) United States Patent
Ziemkowski

(10) Patent No.: US 7,136,094 B2
(45) Date of Patent: Nov. 14, 2006

(54) SHARE LINK BETWEEN IMAGE CAPTURING DEVICES

(75) Inventor: Theodore B. Ziemkowski, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 659 days.

(21) Appl. No.: 10/081,694

(22) Filed: Feb. 22, 2002

(65) Prior Publication Data

US 2003/0160870 A1    Aug. 28, 2003

(51) Int. Cl.
*H04N 5/232*    (2006.01)

(52) U.S. Cl. ............... 348/211.1; 348/211.99; 348/207.99; 348/211.11

(58) Field of Classification Search ............ 348/75, 348/73, 211.3, 375, 24, 207.99, 211.1, 376
See application file for complete search history.

(56) References Cited

U.S. PATENT DOCUMENTS 6,006,039 A * 12/1999 Steinberg et al. ............ 396/57
6,181,883 B1   1/2001 Oswal ...................... 396/429
6,188,431 B1 * 2/2001 Oie .......................... 348/211.5
6,204,877 B1 * 3/2001 Kiyokawa ................ 348/211.3
6,947,075 B1 * 9/2005 Niikawa .................. 348/211.14
2002/0196197 A1 * 12/2002 Watanabe .................... 345/1.1

FOREIGN PATENT DOCUMENTS

| EP | 1133145 | 9/2001 |
| EP | 1158744 | 11/2001 |
| WO | WO 00/19294 | 4/2000 |

OTHER PUBLICATIONS

JetSend "Getting Started Guide," date unknown; available on website: http://www.hp.com...ex/hpjetsendf18931_eng_man.html in pdf format (total of 10 pages).

* cited by examiner

*Primary Examiner*—Ngoc-Yen Vu
*Assistant Examiner*—Anthony J. Daniels

(57) ABSTRACT

A digital image capturing system includes at least two digital image capturing devices and a bi-directional link cable connecting the image capturing devices. The image capturing devices are capable of sharing data items over the bi-directional link cable.

4 Claims, 5 Drawing Sheets

SHARE LINK BETWEEN IMAGE CAPTURING DEVICES

FIELD OF THE INVENTION

The present invention relates generally to image capturing devices, and more particularly to a share link for sharing data items between image capturing devices.

BACKGROUND OF THE INVENTION

Digital image capturing devices sense and capture an image represented by digital information bits. The images may be stored, printed out, and even transferred to other devices. Because of their digital nature, the captured images may be freely transmitted, and may even be transmitted multiple times and to multiple destinations.

Prior art cameras typically transmit images by connecting to a computer. Images are downloaded from the camera to the computer. Alternatively, the camera may be coupled to a docking station connected to the computer. During communications the prior art camera acts as a slave device, with the computer controlling the downloading process. Therefore, an image transfer according to the prior art typically is a one-way transmission from the image capturing device to a computer for storage, transmission, printing, etc. A prior art camera cannot independently establish and regulate a communications session.

In an alternative prior art approach, the camera may be connected to a printer via cable and the camera may download images to the printer. The images are not stored in the printer, although the printer may function as an intermediary and may pass images to an associated computer.

In yet another prior art approach, images may be transferred to other devices using an infrared (IR) link.

Therefore, there remains a need in the art for improvement to image capturing devices.

SUMMARY OF THE INVENTION

A digital image capturing system comprises at least two digital image capturing devices and a bi-directional link cable connecting the image capturing devices. The image capturing devices are capable of sharing data items over the bi-directional link cable.

DETAILED DESCRIPTION

Figure 1:
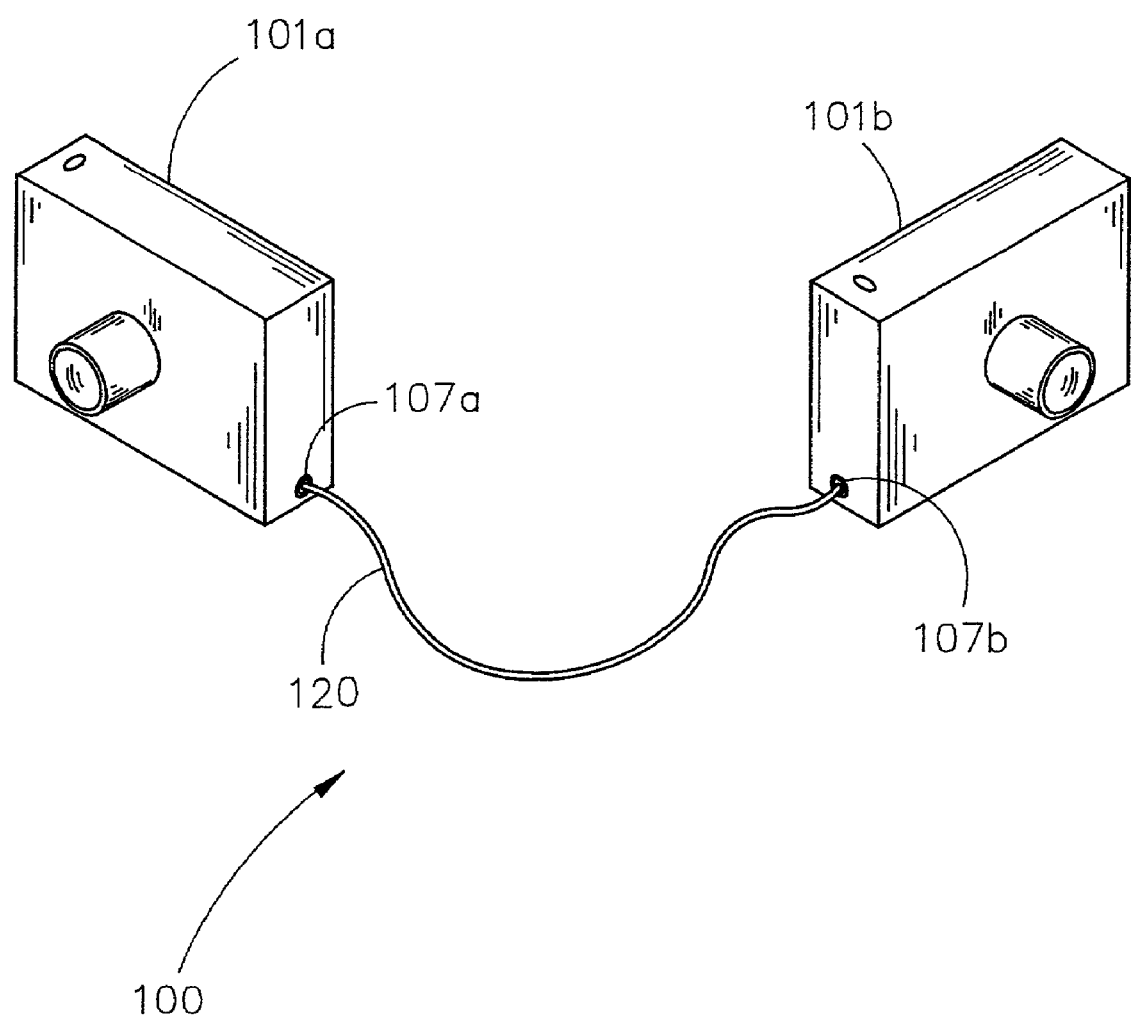
FIG. 1 shows an image sharing system according to one embodiment of the invention.

FIG. 1 shows an image sharing system 100 according to one embodiment of the invention. The image sharing system 100 includes a first image capturing device 101a, a bi-directional link cable 120, and at least a second image capturing device 101b. The bi-directional link cable 120 is connected to a first port 107a on the first image capturing device 101a and to a second port 107b on the second image capturing device 101b. The image sharing system 100 achieves transmission and reception (i.e., sharing) capability between all linked devices using this share link.

In the image sharing system 100, one image capturing device is a master and one or more image capturing devices are slaves. The master may send data items to the slave and may also receive data items, although the master device will likely only transmit data items. The user of the master may select data items to be transmitted. The slave or slaves receive data items and display them. The slave or slaves may also transmit data items, but can only do so in accordance with the master device wherein the master device controls the communication process. In addition, the slave or slaves may store the received data items.

The data items may be any manner of data. For example, the data items may be images, portions of images, zoom images, real time image views (i.e., a series of images captured in a live view mode), or image information. The image information may include an image plus image capturing device-generated data. For example, the image information may include an image plus a cursor, crosshairs, etc., generated by the master image capturing device. Other image information may include a time stamp, image resolution setting, measured light value, etc.

The pointer or overlay may be transmitted to help explain a picture. The pointer may be controlled by the master image capturing device through user input and may be used to point to or indicate a portion of the image, such as to suggest to the recipient to "look at this portion of the image."

The I/O port 107 may both transmit and receive data items. The I/O port 107 may be a modified audio visual (A/V) port having input capability, i.e., it may include an input line to an input pin on the processor of the image capturing device (see FIG. 2). In another embodiment, the I/O port 107 may be a Universal Serial Bus (USB) port capable of transmitting and receiving data (it should be understood that a prior art digital camera that includes a USB port does not have a processor input connected to the USB port for accepting inputs from other devices). Alternatively, the I/O port 107 may be an IR port capable of transmitting and receiving data via infrared light signals.

In the image sharing system 100, one of the image capturing devices may act as a pseudo host. A host may be an electronic device that controls a communication of data. For example, a digital camera may be connected to a personal computer via a USB cable for downloading images to be printed and stored. In this scenario, the computer is the host, and regulates the communication process.

As a pseudo host, a particular image capturing device may regulate communications between two or more connected image capturing devices. This may be done, for example, to prevent two devices from transmitting at the same time. However, it should be understood that the particular image capturing device may not always be the pseudo host. The hosting duties may change between sessions and even within a session. The hosting duties may be assigned based on the configuration of the bi-directional link cable 120, on the configuration of the I/O ports 107, on user inputs, on the order of connection of image capturing devices, etc.

Figure 2:
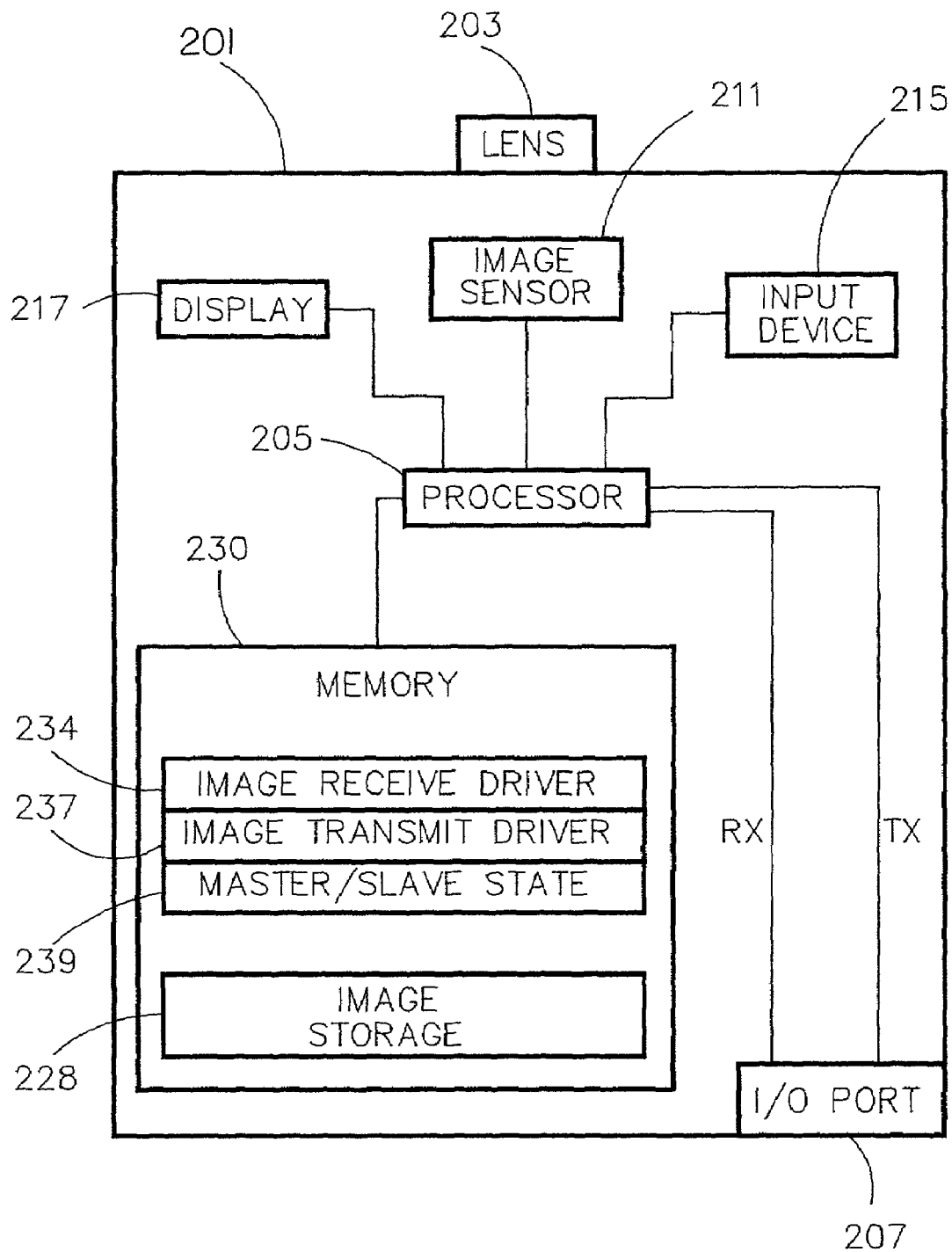
FIG. 2 is a schematic of a digital image capturing device according to another embodiment of the invention.

FIG. 2 is a schematic of a digital image capturing device 201 according to another embodiment of the invention. The image capturing device 201 includes a lens 203, an electronic image sensor 211, an input device 215, a display 217, a processor 205, the I/O port 207 and a memory 230.

The image sensor 211 may be any type of electronic image sensor capable of capturing images, such as a charge coupled device (CCD) sensor or a complementary metal oxide semiconductor (CMOS) sensor, for example.

The input device 215 may be any manner of input device, including any manner of buttons or keys, touch-sensitive menu, etc.

The processor 205 may be any type of general purpose processor. The processor 205 executes a control routine contained in the memory 230. In addition, the processor 205 receives inputs and conducts image capturing operations.

The display 217 may be any type of display, such as an LCD screen, etc. The display 217 may display received data items, among other things. In addition, the display 217 may display received data items and may display data items that are being transmitted.

The memory 230 may be any type of digital memory. The memory 230 may include, among other things, an image receive driver 234, an image transmit driver 237, a master/slave state 239, and an image storage 228. In addition, the memory 230 may store software or firmware to be executed by the processor 205.

The image storage 228 may store captured images. In addition, the image storage 228 may store received data items. The image storage 228 may be part of an internal memory, as shown, or alternatively may be any manner of removable memory medium.

The image receive driver 234 is a software driver used by the processor 205 to receive data items from the I/O port 207. The image receive driver 234 therefore is used to receive data items from other image capturing devices linked to the image capturing device 201.

The image transmit driver 237 is a software driver used by the processor 205 to transmit data items to the I/O port 207. The image transmit driver 237 therefore is used to transmit data items to other image capturing devices linked to the image capturing device 201.

The master/slave state 239 is an optional variable that is included if the user can select the image capturing device 201 to be a master device or a slave device. Alternatively, whether the image capturing device 201 is a master or slave may depend on the bi-directional link cable 120, wherein an image capturing device 201 connected to a particular end of the bi-directional link cable 120 is a master and another image capturing device connected at the other end is a slave.

As previously mentioned, the I/O port 207 may be an A/V port, a USB port, or even a customized port.

For a bi-directional A/V link cable, the master and slave are determined by the mode in the camera. The bi-directional A/V link cable may automatically set the mode in a camera when connected. For a USB cable, the master/slave determination may be controlled by a firmware on each camera.

In operation, the I/O port 207 includes a receive line (RX) and a transmit line (TX) connected to respective input and output pins of the processor 205. The processor 205 detects when the bi-directional link cable 120 is connected to the I/O port 207 and determines if the image capturing device 201 is a master or slave. If the image capturing device 201 is a master, then the processor 205 conducts communications over the bi-directional link cable 120, including transmitting and receiving data items. If the image capturing device 201 is a slave, the processor 205 accepts data from the bi-directional link cable 120 and passes data items to the display 217. In addition, the slave device may transmit data items, but must do so in accordance with the master device. If an appropriate user input is detected, the processor 205 may save a received data item to the memory 230, such as in the image storage 228, for example.

Figure 3:
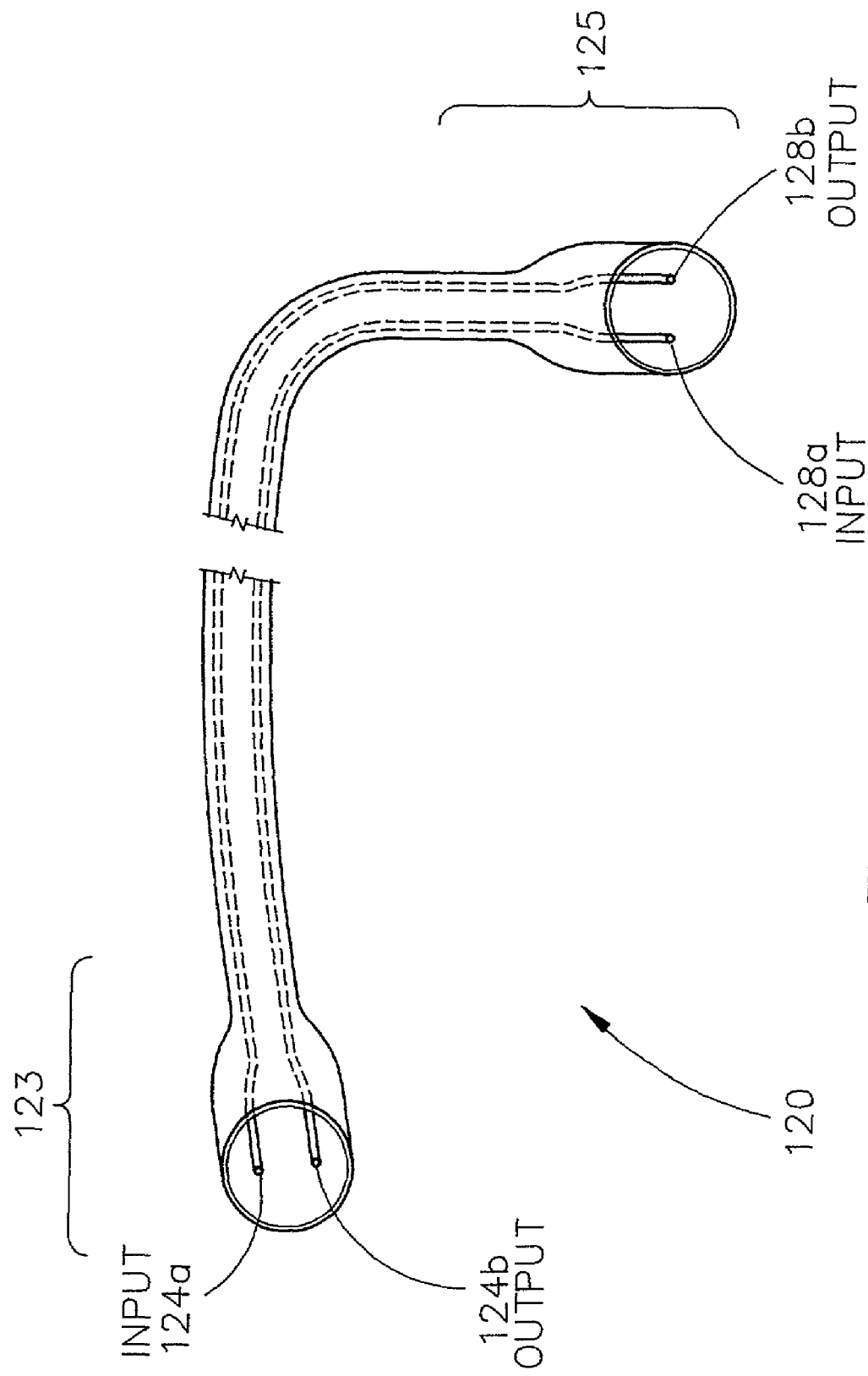
FIG. 3 shows the bi-directional link cable according to one embodiment.

FIG. 3 shows the bi-directional link cable 120 according to one embodiment. The bi-directional link cable 120 has a first end 123 and a second end 125. An input pin 124a and the associated conductor at the first end 123 becomes the output pin 128b at the second end 125. Likewise, the output pin 124b and the associated conductor at the first end 123 becomes the input pin 128a at the second end 125. Therefore, an output signal from one device becomes an input signal to another device or devices. Other pins, such as an audio output pin, may be included but are not shown for clarity.

Figure 4:
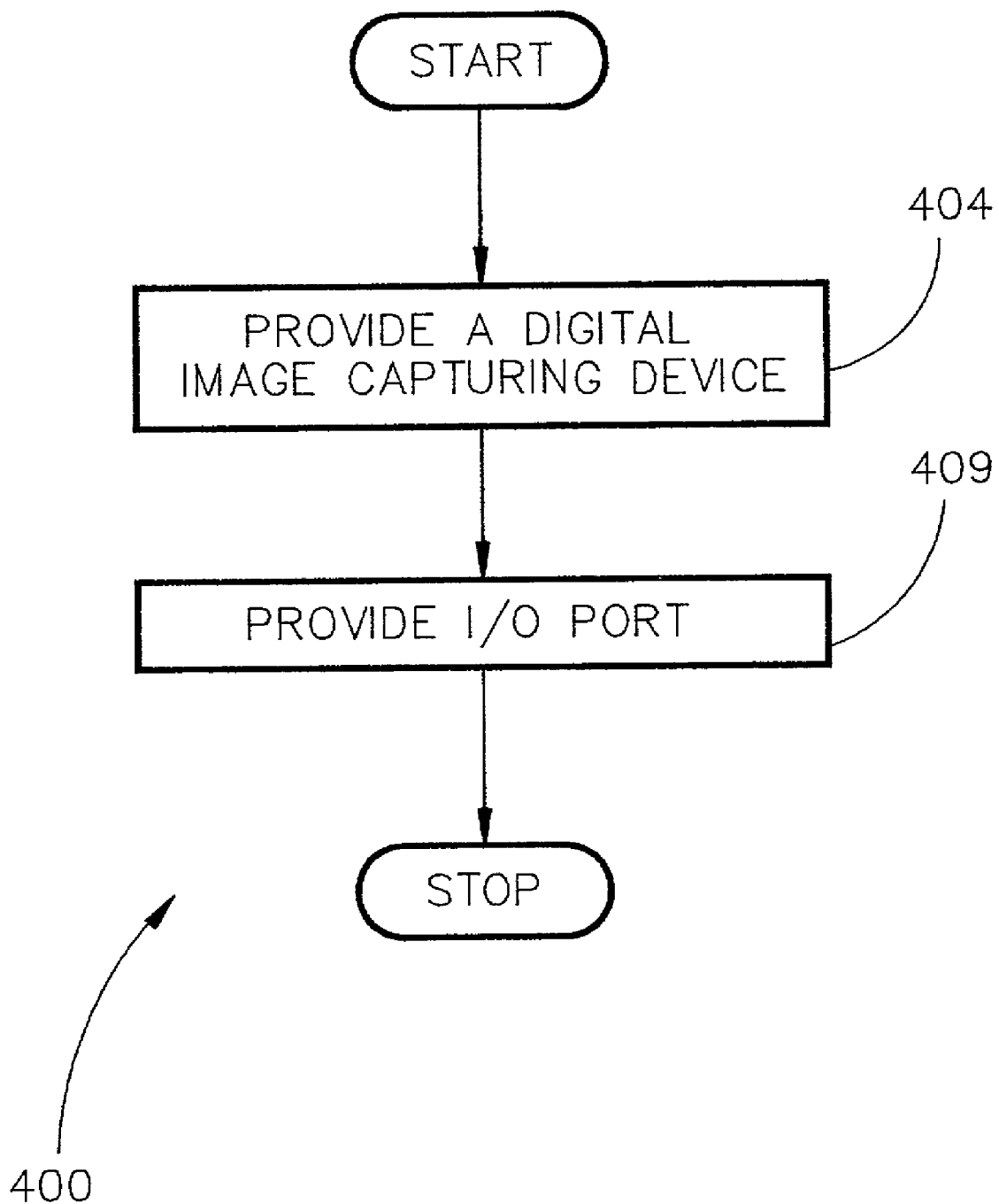
FIG. 4 is a flowchart of a method of linking a first digital image capture device to one or more other digital image capturing devices according to another embodiment of the invention.

FIG. 4 is a flowchart 400 of a method of linking a first digital image capturing device to one or more other digital image capturing devices according to another embodiment of the invention. In step 404, at least two digital image capturing devices capable of transmitting and receiving digital images are provided.

In step 409, I/O ports are provided in the at least two digital image capturing devices, with the I/O ports being capable of accepting a bi-directional link cable. Therefore, image capturing devices may be linked and may share pictures and information using the bi-directional link cable. The sharing may include sharing real time images captured during a live mode over the share link. The sharing may also include sharing images plus image capturing device-generated data, such as a pointer, etc.

Figure 5:
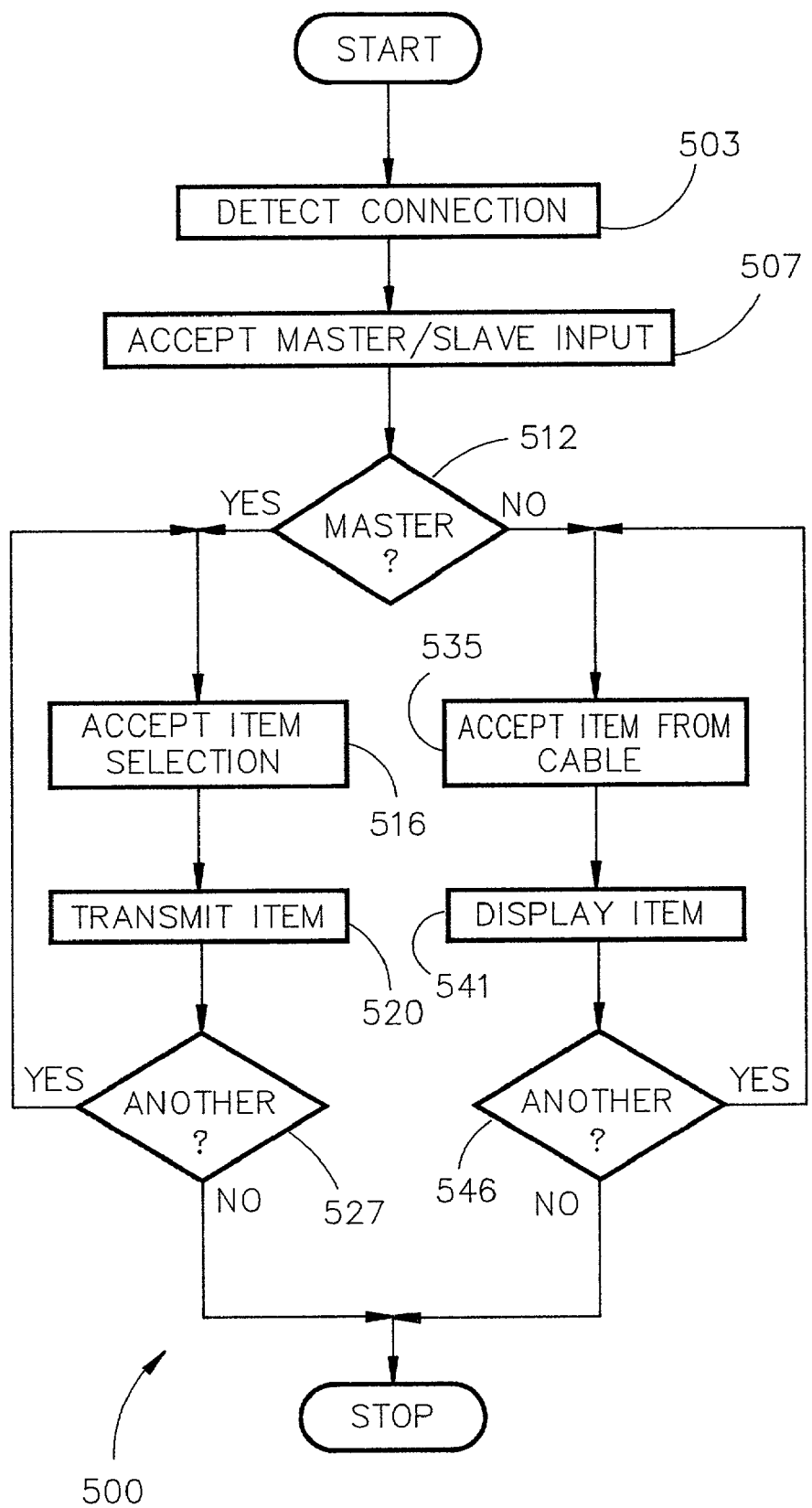
FIG. 5 is a flowchart of a method of linking according to yet another embodiment of the invention.

FIG. 5 is a flowchart 500 of a method of linking a first digital image capturing device to one or more other digital image capturing devices according to yet another embodiment of the invention. In step 503, a connection of a bi-directional link cable 120 to an image capturing device is detected. This may be done through an electrical impedance measurement or an electrical current measurement in the linked image capturing device, for example.

In step 507, a master/slave input is accepted. The input may be the connection to a specific end of a specific bi-directional link cable. Alternatively, the input may be a user input that designates whether the image capturing device 101 is the master or the slave.

In step 512, the image capturing device determines whether it is a master device or a slave device. If the device is a master, the method proceeds to step 516; otherwise, it branches to step 535.

In step 516, the image capturing device is a master device and accepts a data item selection by the user. The data item selection may be a selection of an image to be transmitted. Alternatively, the selection may be a real time live mode of successive images (i.e., a review mode). In another alternative, the selection may include an image plus camera information, such as a pointer overlay, etc.

In step 520, the data item is transmitted to one or more slave devices over the bi-directional link cable 120.

In step 527, the method determines whether another transmission is to be performed. If another transmission is to be performed, the method branches back to step 516; otherwise, it exits.

In step 535, the image capturing device is a slave device. Therefore, it accepts a data item from the bi-directional link cable 120. In addition, the image capturing device may transmit data items to the master device, but must do so in accordance with the master device.

In step 541, the data item may be displayed. Alternatively, the data item may be stored or even retransmitted to another image capturing device.

In step 546, the method determines whether another data item is to be received. If it is, the method branches back to step 535; otherwise, it exits.

The share link between image capturing devices according to the invention may be employed by any digital still camera. In addition, it may be employed by video cameras that capture still images.

The share link between image capturing devices according to the invention differs from the prior art in that linked image capturing devices according to the invention are capable of sharing data items with other devices, including sharing images, sharing image portions, and sharing camera-generated data.

The share link between image capturing devices according to the invention provides several benefits. It allows sharing of many types of data items between image capturing devices. It allows flexibility in that any image capturing device can both transmit and receive. This may allow users to share images, may allow users to collaborate on settings, lighting, angles, etc., and allows users to provide feedback to each other in advance of image captures. Moreover, it may allow users to consolidate images between image capturing devices. Furthermore, communication of data items is simplified and regulated by operating one image capturing device as a pseudo host device.

I claim:

1. A method of linking a first digital image capturing device to one or more other digital image capturing devices, comprising the steps of:
    obtaining a first digital image capturing device capable of sending and receiving data items over a bi-directional link cable, said first digital image capturing device comprising a first I/O port;
    obtaining a second digital image capturing device capable of sending and receiving data items over a bi-directional link cable, said second digital image capturing device comprising a second I/O port;
    obtaining a bi-directional link cable having a first end and a second end;
    connecting the first end of the cable to the first I/O port;
    connecting the second end of the cable to the second I/O port;
    using the first digital image capturing device to capture an image;
    transmitting a real time view of the image from the first digital image capturing device to the second digital image capturing device over the bi-directional link cable, which directly connects the first digital image capturing device to the second digital image capturing device;
    while transmitting the real time view, also transmitting to the second device from the first device a pointer overlay, wherein pointer overlay and the real time view of the image are displayed simultaneously on a display screen of the second device such that the pointer overlay overlays the real time view of the image; and
    enabling the user to move the pointer within the display screen of the second device by manipulating a control on the first device.

2. The method of claim 1, further comprising the step of sharing image information.

3. The method of claim 1, wherein the first and/or the second digital image capturing device is capable of operating as a pseudo host.

4. The method of claim 1, further comprising the steps of:
    detecting a connection of a bi-directional link cable in said digital image capturing device;
    accepting a master or slave input that determines whether said digital image capturing device is a master or a slave;
    accepting an image selection of a first data item to be sent to a connected slave digital image capturing device if said digital image capturing device is a master;
    transmitting said first data item to said connected slave digital image capturing device if said digital image capturing device is a master;
    accepting a second data item from a connected master digital image capturing device if said digital image capturing device is a slave; and
    displaying said second data item on said digital image capturing device if said digital image capturing device is a slave.

* * * * *

UNITED STATES PATENT AND TRADEMARK OFFICE
CERTIFICATE OF CORRECTION

| | |
|---|---|
| PATENT NO. | : 7,136,094 B2 |
| APPLICATION NO. | : 10/081694 |
| DATED | : November 14, 2006 |
| INVENTOR(S) | : Theodore B. Ziemkowski |

Page 1 of 1

It is certified that error appears in the above-identified patent and that said Letters Patent is hereby corrected as shown below:

In column 3, line 48, delete "AN" and insert -- A/V --, therefor.

Signed and Sealed this

Twelfth Day of May, 2009

JOHN DOLL
*Acting Director of the United States Patent and Trademark Office*